United States Patent Office 2,947,791
Patented Aug. 2, 1960

2,947,791

TWO-ZONE MONONITRATION OF TOLUENE

Rowland K. Adams, Wilmington, Del., assignor to E. I. du Pont de Nemours and Company, Wilmington, Del., a corporation of Delaware No Drawing. Filed Jan. 24, 1957, Ser. No. 635,987

4 Claims. (Cl. 260—645)

This invention is directed to an improvement in a continuous process for the production of mononitrotoluene. The crude mononitrotoluene obtained may be subsequently further nitrated to give a dinitrotoluene isomer mixture from which 2,4-dinitrotoluene may be separated. This 2,4-dinitrotoluene isomer is valuable as an intermediate for toluene-2,4-diisocyanate which is used to make polyurethane foams and elastomers.

Batch procedures for the preparation of dinitrotoluene from toluene are well known. The usual batch process consists of adding toluene to a mixture of nitric and sulfuric acids containing sufficient nitric acid to produce a monostage oil containing about 20% dinitrotoluene; this method may be varied to give as little as 5% or as much as 50% dinitrotoluene. The crude mononitrotoluene is separated from the spent acid and is subsequently converted completely to dinitrotoluene by the addition of a stronger mixed acid than that used for the mononitration. The sulfuric acid used for preparing the monostage oil (or crude mononitrotoluene) is generally spent acid recovered from this final nitration step.

In attempting to prepare mononitrotoluene oil continuously, several problems are encountered. If the proportions of raw materials used in the batch mononitration process are fed continuously to a well-stirred reactor, most of the excess nitric acid in the mixed acid is not consumed. Nitric acid is expensive to recover. If the amount of nitric acid in the mixed acid is reduced so that about one mole of nitric acid is present for each mole of toluene, the nitric acid is consumed nearly quantitatively within a reasonable length of time but the mononitrotoluene obtained is less satisfactory in that further nitration of this grade of mononitrotoluene gives a poor grade of dinitrotoluene which contains less 2,4-isomer than the dinitrotoluene isomer mixture generally produced by the batch process.

It is an object of the present invention to provide an improved process for the continuous production of mononitrotoluene which mononitrotoluene can be subsequently further nitrated to an isomer mixture containing a high proportion of the 2,4-dinitrotoluene isomer.

It is another object of this invention to provide an improved process for the continuous nitration of toluene which process will efficiently utilize the nitric acid reactant.

The mixture of mononitrotoluene isomers produced by the present process are extremely useful as intermediates for many valuable chemicals. This isomeric mixture may be nitrated to a dinitrotoluene isomeric mixture rich in 2,4-isomer; this dinitrotoluene isomeric mixture may then be further nitrated to trinitrotoluene, a well-known explosive. This isomeric mixture may also be reduced catalytically to produce toluene diamine; this toluene diamine may be converted to toluene diisocyanate in 90 to 97% yield in accordance with U.S. Patent No. 2,683,160; this toluene diisocyanate is a valuable intermediate in the preparation of coating compositions, foamed and molded plastics, resilient foams and adhesives. The toluene diamine may also be used as a direct oxidation black for furs and hair and as a chain-extending agent for polyisocyanates and bis-chloroformates.

More specifically, the present invention is directed to a continuous process for the nitration of toluene wherein a significant improvement is effected by continuously contacting substantially equimolar quantities of a mixed nitration acid nitric acid component and toluene in a two-reactor system at 50–100° C., which comprises reacting in the first zone, a constant composition of 0.4–0.7 mole of toluene per mole of nitric acid component until an amount of nitric acid substantially in molar equivalence to the toluene is consumed and the effluent from this reaction zone contains substantially no free toluene, then contacting the effluent in a second reaction zone with toluene substantially in molar equivalence to the nitric acid in the initial effluent until said nitric acid is consumed, thereby producing a monostage oil rich in para-nitro groups and suitable for complete conversion into a dinitrotoluene isomeric mixture having an increased 2,4-dinitrotoluene content.

As a preferred embodiment of the present invention an improvement in the continuous nitration of toluene is effected by continuously reacting substantially equimolar quantities of nitric acid component of the nitration acid and toluene in a two-reactor system at 80° C., which comprises reacting about 60% of the toluene with a nitrating mixture consisting of nitric acid, sulfuric acid, and water until about 60% of the total nitric acid utilized is consumed and the effluent from this reaction zone contains substantially no free toluene, then contacting the effluent in a second reaction zone with toluene substantially equivalent to the nitric acid in the initial effluent until said nitric acid is consumed, thereby producing (1) a monostage oil rich in para-nitro groups and suitable for complete conversion into a dinitrotoluene isomeric mixture having an increased 2,4-dinitrotoluene content and (2) a spent acid layer comprising about 70% aqueous sulfuric acid, said dilution of acid being produced by the water originally present in the nitrating mixture and the water of nitration.

The continuous mononitration of toluene is carried out, according to the present invention, in a two-reactor system to produce a monostage oil which can be subsequently further nitrated to a dinitrotoluene mixture containing a higher ratio of the 2:4 to 2:6-isomer than can be made with a monostage oil produced by continuously contacting approximately equivalent molar quantities of nitric acid and toluene in a single reactor. All of the nitration acid (a mixture of sulfuric acid and nitric acid, and water) and about 40–70% of the toluene are fed continuously to the first reactor. Mononitrotoluene crude is produced. This reaction mass overflows continuously to a second reactor where the remainder of the toluene is added. The effluent from this zone comprises a crude mononitrotoluene oil and aqueous sulfuric acid. This monostage oil is suitable for further nitration to a dinitrotoluene mixture containing a high ratio of the 2:4 to 2:6-isomer.

The character of the dinitrotoluene made from the monostage oil depends upon the way in which the mononitration is carried out. In the graph which follows is shown the dependence of the apparent freezing point of the dinitrotoluene on the molar excess of nitric acid used in making the mononitrotoluene. There is a definite rise in the freezing point when an excess of nitric acid is used up to a maximum of about two degrees, centigrade, at a full molar excess. Beyond this point there is hardly any further effect. Infrared analysis of dinitrotoluene isomer mixtures indicate that the higher melting material has a greater ratio of the 2,4- to the 2,6-isomer. A trace of 2,3-, 2,5- and 3,4-dinitrotoluene is present whether excess nitric acid is used or not.

*Variation of dinitrotoluene freezing point with excess of nitric acid used to make mononitrotoluene*

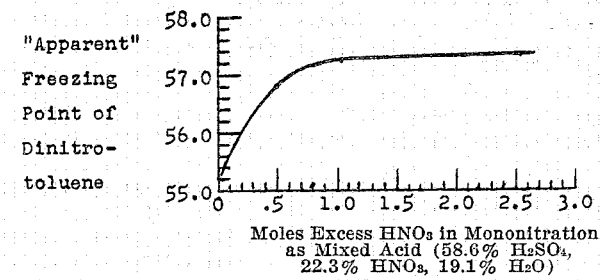

Moles Excess HNO₃ in Mononitration as Mixed Acid (58.6% H₂SO₄, 22.3% HNO₃, 19.1% H₂O)

In a continuous reactor in which approximately equimolar amounts of nitric acid and toluene are contacted, the product oil will lead to a dinitrotoluene mixture whose melting point is shown by the ordinate value for 0.0 mole excess nitric acid in the graph. The improvement effected by the present invention consists in carrying out the mononitration in two stages. In the first stage, the nitric acid present in the nitration acid is contacted with less than a molar equivalent of toluene; hence the product oil can lead to dinitroluene with a higher apparent freezing point. This corresponds to a point along the curve in the graph. The unreacted nitric acid is carried over into the second stage where sufficient toluene is added to consume it; this corresponds to the beginning of the curve in the graph. The overall monostage oil can thus be further nitrated to dinitrotoluene whose melting point will be better than that achieved by a continuous single reactor monostage employing toluene and nitric acid in equal molar ratios.

In Table 1 which follows, a comparison is made of the apparent freezing point and the 2:4/2:6 isomer ratio of dinitrotoluene obtained by several routes. The dinitrotoluene may be prepared by a batch one-stage dinitration of toluene. The dinitrotoluene may be made by a batch nitration of mononitrotoluene prepared by: (a) continuous one-reactor monostage or (b) continuous two-reactor monostage which contains excess nitric acid in the first reactor. The data show that there is a definite correlation between the variations in the apparent freezing point and 2,4:2,6-isomer ratio. It is also evident that it is possible to gain a dinitrotoluene with a higher 2,4:2,6-isomer ratio by nitrating the monostage mononitrotoluene oil provided by the process improvement of the present invention than can be achieved from the product of continuous one-stage mononitration.

TABLE 1

*Composition of dinitrotoluene from various routes*

| Route | Dinitrotoluene Property | |
|---|---|---|
| | Apparent Freezing Point (° C.) | 2,4/2,6-Isomer Ratio |
| T to MNT by 1-stage batch nitration; MNT to DNT by 1-stage batch nitration | 56.6 | 80.6/19.4 |
| T to MNT by continuous 1-stage mononitration; MNT to DNT by 1-stage batch nitration | 55.6 | 79.6/20.4 |
| T to MNT by continuous 2-stage mononitration; MNT to DNT by 1-stage batch nitration | 56.5 | 80.9/19.1 |
| T to MNT in first reactor of continuous 2-stage mononitration is nitrated by a 1-stage batch process to DNT | 57.2 | 81.4/18.6 |

T=toluene.
MNT=mononitrotoluene crude.
DNT=dinitrotoluene mixture.

The continuous process for making mononitrotoluene may be carried out with $n$ zones. Zones 1 to $(n-1)$ contain in each individual zone less molar equivalents of toluene than nitric acid. In the final $n$th zone, sufficient toluene is added to consume the remaining nitric acid. In ideality, an infinite number of zones would be desirable. In practice, two zones are preferable.

The continuous mononitration may employ an overall ratio of one or more moles of nitric acid for each mole of toluene. The graph shows that a large excess of acid will be wasteful. If the contact time and temperature are adjusted to produce mononitrotoluene, the excess acid will present a costly recovery problem. It is preferred to use about 1.05 moles of nitric acid in the monostage for each mole of toluene.

The molar ratio of the toluene to the nitric acid in the first reaction zone in the preferred two-reactor monostage continuous process is 0.4–0.7. If too little toluene is added to the first reaction zone the major part of the product oil will be formed in the second zone. The dinitrotoluene obtainable from such an oil will have a lower freezing point and a smaller 2:4/2:6 isomer ratio. If nearly all the toluene is introduced into the first reaction zone, the process will approximate the one-stage mononitration again and lead to an inferior product oil. The preferred procedure introduces about 60% of the toluene in the first reaction zone.

The process may be operated at any temperature between 50–100° C. Below 50° C. the nitration proceeds too slowly. Above 100° C. oxidation begins to occur. Nitrophenols and cresols appear as by-products. This undesirable side reaction cannot be thwarted by using an inert atmosphere such as nitrogen. The preferred temperature is about 80° C. It is not necessary that the temperature be the same in each reactor. It is maintained the same in the preferred embodiment of this invention.

The contact time for each reaction zone will be a function of the strength of the nitration mixture and the temperature. The contact time must be the same if the reactors have equal volumes. If the volumes are not equal, the contact times need not be alike. In the preferred process, approximately the same hold-up time is used for each of the reactors.

Since the mononitrotoluene slowly but definitely is converted to dinitrotoluene when the mononitration is carried out in excess nitric acid, the contact time is important. The toluene must not contact the excess nitric acid longer than necessary to be mononitrated under the conditions of temperature and nitrating mixture strength prevailing. Therefore, the contact time must be adjusted so that the effluent from the reaction zone contains approximately all the nitric acid in excess of that amount required to convert the toluene in that zone to mononitrotoluene. In the last zone (the second in the preferred process) the hold-up time should be sufficient to consume the toluene introduced into that stage.

In the preferred process the contact time at about 80° C. is about 7–10 minutes. Approximately 11 mole percent of the oil from the first reactor is dinitrotoluene. Consequently, about 3.5% of the oil leaving the second stage is unreacted toluene. Long contact times and high reaction temperatures favor dinitration.

The nitrating mixture contains about 50–60% sulfuric acid, 20–40% nitric acid, and 10–20% water (by weight). The preferred mixture contains about 60% sulfuric acid, 20% nitric acid, and 20% water. This mixture may be prepared by blending 95% nitric acid with spent sulfuric acid solutions obtained in the course of the process (and any subsequent nitration in the production of dinitrotoluene). The monostage oil is separated from the spent acid before that acid is recovered. The spent acid from the second reactor of the preferred monostage process may contain about 62–75% sulfuric acid.

The design of the reactors used will depend somewhat on the scale at which the nitration process is being run. The following considerations should be taken into account by those skilled in the art.

It is important that vigorous agitation be provided to achieve a uniform composition because the nitration components will tend to separate into a two-layer system if the mixing action is insufficient. An agitation intensity approximately equivalent to 50 horsepower/1000 gallons will generally be adequate.

In the preferred process, the reactants are introduced near the bottom of a reactor and the products are allowed to exit near the top. However, the reactants may enter near the top and the products may leave near the bottom. Furthermore, the reactants may be introduced at the same level as the products are discharged provided the ports are on opposite sides of the reactor.

Since the nitration is an exothermic reaction, the reactors must be provided with means to remove enough of the heat to maintain proper temperature control. The reaction mixture presents a fire hazard; the upper surface of the reaction mass should, therefore, be blanketed with carbon dioxide or a similar inert atmosphere.

EXAMPLES

Determination of dinitrotoluene freezing points

Crude molten dinitrotoluene is washed with water, neutralized with a dilute ammonia or soda ash wash, and again treated with water. The molten sample is twice dried over calcium chloride at 80° C. The drying procedure is standardized because prolonged drying or drying at higher temperatures raises the freezing point of the dinitrotoluene. This change in freezing point appears to be caused by the loss of volatile aliphatic hydrocarbons originally contained in the toluene.

The freezing points are run by melting the dried sample of dinitrotoluene in a test tube at least an inch in diameter. The melt is allowed to cool until crystallization begins. Since supercooling generally occurs, the temperature will usually rise at the initiation of crystallization. The maximum temperature reached during this rise is taken as the freezing point. This type of freezing point is called an "apparent" freezing point. It is slightly lower than the "true" freezing point which is determined by measuring the temperature at which the last crystal in thermal equilibrium with the melt disappears.

The present invention is illustrated in detail by the representative examples given below. Control of the process of the present invention is maintained by conventional means, the specific means utilized not being critical. For example, initial checks can be made by analyzing the effluent for nitric acid content and nitrobody content. The acid phase of the effluent is titrated for total acid, the nitric acid is boiled off, the sulfuric acid is titrated, the nitric acid content is obtained as the difference. The organic phase is treated with excess titanous sulfate which reduces the nitro groups to amino groups and then back-titrated with ferric chloride; this analysis discloses how much nitric acid was consumed in nitrating the toluene and the unreacted nitric acid is the difference between the initial nitric acid content and this nitrobody value. Once the flow rates have been correlated with the analysis, the process is controlled by adjusting the flow rates to the proper value.

EXAMPLE I 297 parts of mixed (58.6% sulfuric acid, 22.3% nitric acid and 19.1% water) nitration acid (containing 1.05 moles nitric acid) and 55.3 parts (0.60 mole) of nitration grade toluene are fed continuously as separate streams to a reactor equipped with an agitator providing an agitation intensity equivalent to 50 H.P./1000 gal. The temperature in the reaction zone is maintained at 80° C. by cooling. The combined feed rate of mixed acid and toluene to the reaction zone is adjusted so that the average hold up time in the reactor is approximately 8 min. Under these conditions, about 63% (0.662 mole) of the nitric acid fed is consumed. The entire effluent (containing 0.388 mole nitric acid) from this reactor and 36.8 parts (0.4 mole) of additional toluene are fed continuously to a second reactor also maintained at 80° C. by cooling and agitated with an intensity equivalent to 50 H.P./1000 gal. The combined feed rate to the second reaction zone is adjusted to give an average hold up time of 8 min. The nitric acid remaining in the effluent from the first reaction zone is substantially reacted in the second reactor.

The effluent from the second reactor is allowed to separate. Two layers are obtained: A layer of crude mononitrotoluene containing about 5% toluene and 10% dinitrotoluene and an aqueous layer of about 69% sulfuric acid containing small amounts of oxides of nitrogen and nitric acid.

The crude mononitrotoluene layer is converted to dinitrotoluene by adding mixed nitration acid (by weight, 58% sulfuric acid and 42% nitric acid) to it in an agitated vessel maintained at 80° C. A 5–10% molar excess of nitric acid is used. When the addition of acid is complete, the mixture is maintained at 80° C. for 10 min. to insure that the dinitration is finished. The dinitrotoluene is separated from the spent acid at 65° C. and is washed, in turn, with hot water, 1% sodium carbonate solution and again with hot water. The dried dinitrotoluene mixture has an "apparent" freezing point of 56.5–56.6° C.

If all the toluene and mixed acid needed for the mononitration (92.1 parts toluene to 297 parts mixed acid containing 58.6% sulfuric acid, 22.3% nitric acid and 19.1% water) are fed continuously to a single well-agitated reactor maintained at 80° C. and at a rate such that the average hold up time in the reactor is 10 min., a crude mononitrotoluene is produced which on dinitration as described above yields dinitrotoluene with an "apparent" freezing point of 55.5° C.

EXAMPLE 2

36.8 parts (0.40 mole) of toluene and 297 parts of mixed mononitration acid having the composition of the mixed acid of Example 1 (containing 1.05 moles nitric acid) are fed continuously as separate streams to a reactor maintained at 80° C. and agitated with an intensity equivalent to 50 H.P./1000 gal. The combined feed rate of toluene and mixed acid is adjusted to give an average hold up time of 8 min. which consumes about 40% of the nitric acid (0.42 mole). The effluent from the first reactor (containing 0.63 mole nitric acid) and 55.3 parts (0.60 mole) of toluene are then fed by separate streams into a second reactor at 80° C. (similarly agitated) at a combined feed rate which gives an average hold up time of 8 min. The consumption of the nitric acid is substantially completed in the second reactor. The effluent from the second reactor is then separated into two layers: crude mononitrotoluene and aqueous 69% sulfuric acid.

Further nitration of the crude mononitrotoluene (as described in Example 1) produces a dinitrotoluene mixture with an "apparent" freezing point of 56.3° C.

EXAMPLE 3

Toluene and mixed mononitration acid are reacted continuously as in Example 1 except that 64.5 parts (0.70 mole) of toluene to 297 parts (1.05 mole nitric acid) of mixed acid are fed to the first reactor. The combined feed rate of toluene and mixed acid is adjusted to give an average hold up time of 8 min. which consumes about 70% of the nitric acid (0.74 mole). The effluent from the first reactor (containing 0.31 mole nitric acid) and 27.6 parts (0.30 mole) of toluene are then fed by separate streams into a second reactor at a combined feed rate which gives an average hold up time of 8 min. The consumption of the nitric acid is substantially completed in the second reactor. The effluent from the second reactor is then separated into two layers: mononitrotoluene and 69% aqueous sulfuric acid.

Further nitration of the crude mononitrotoluene (as described in Example 1) produces a dinitrotoluene mixture with an "apparent" freezing point of 56.3° C.

EXAMPLE 4

55.3 parts (0.60 mole) of toluene and 207 parts of mixed (by weight, 58% sulfuric acid, 32% nitric acid, and 10% water) acid containing 1.05 moles nitric acid are fed by separate streams (as in Example 1) to a vigorously agitated reactor maintained at 65° C. The combined feed rate is adjusted so that about 63% of the nitric acid (0.66 mole) fed is consumed. The effluent from the first reactor (containing 0.39 mole of nitric acid) and 36.8 parts (0.40 mole) toluene are fed by separate streams into a second reactor maintained at 65° C. The hold up time in the second reactor is adjusted so that the nitric acid is substantially consumed. The effluent from the second reactor is subsequently separated into two layers: mononitrotoluene and aqueous 75% sulfuric acid. The crude mononitrotoluene is further nitrated (as described in Example 1) to give a dinitrotoluene mixture with an "apparent" freezing point of 56.3° C.

If all the reactants are contacted in a single reactor (as described in Example 1) at 65° C. for a time interval long enough to allow the nitric acid to be substantially consumed a mononitrotoluene oil is produced which on further nitration gives a dinitrotoluene mixture with an "apparent" freezing point of 55.6° C.

EXAMPLE 5

207 parts of mixed (58% sulfuric acid, 32% nitric acid and 10% water) nitration acid (containing 1.05 moles of nitric acid) and 55.3 parts (0.60 mole) of toluene are continuously fed by separate streams into a reactor maintained at 55° C. and agitated with an intensity equivalent to 50 H.P./1000 gal. The contact time is adjusted so that about 65% of the nitric acid (0.68 mole) is consumed. The effluent from the first reactor (containing 0.37 mole nitric acid) and 36.8 parts (0.40 mole) of toluene are fed by separate streams into a second reactor maintained at 55° C. and agitated with an intensity equivalent to 50 H.P./1000 gal. The contact time is adjusted so that the nitric acid is substantially consumed. The effluent from the second reactor is subsequently separated into two layers: crude mononitrotoluene and aqueous 75% sulfuric acid.

Further nitration of the crude mononitrotoluene (carried out as described in Example 1) produces a dinitrotoluene mixture with an "apparent" freezing point of 56.7° C.

If all the toluene and mixed acid for the mononitration (92.1 parts toluene to 207 parts mixed acid containing 58% sulfuric acid, 32% nitric acid and 10% water) are fed continuously to a single reactor maintained at 55° C. and at a rate such that the nitric acid is substantially reacted, a crude mononitrotoluene is produced which on further nitration (as described in Example 1) yields a dinitrotoluene mixture with an "apparent" freezing point of 55.9° C.

EXAMPLE 6

270 parts of mixed (51.3% sulfuric acid, 24.5% nitric acid and 24.2% water) nitration acid (containing 1.05 mole nitric acid) and 55.3 parts (0.60 mole) of toluene are continuously fed by separate streams into a reactor maintained at 90° C. and agitated with an intensity equivalent to 50 H.P./1000 gal. The combined feed rate is adjusted so that about 65% of the nitric acid (0.68 mole) is consumed. The effluent from the first reactor containing 0.37 mole nitric acid and 36.8 parts (0.40 mole) of toluene are fed to a second reactor maintained at 90° C. and agitated with an intensity equivalent to 50 H.P./1000 gal. The contact time is adjusted so that the nitric acid is substantially consumed. The effluent from the second reactor is subsequently separated into two layers: crude mononitrotoluene and aqueous 62% sulfuric acid.

Further nitration of the crude mononitrotoluene (carried out as described in Example 1) produces a dinitrotoluene mixture with an "apparent" freezing point of 56.3° C.

If all the toluene and mixed acid for the mononitration (92.1 parts toluene to 270 parts mixed acid containing 51.3% sulfuric acid, 24.5% nitric acid and 24.2% water) are fed continuously to a single reactor maintained at 90° C. and at a rate such that the nitric acid is substantially reacted, a crude mononitrotoluene is produced which on further nitration (as described in Example 1) yields a dinitrotoluene mixture with an "apparent" freezing point of 55.4° C.

I claim:

1. In a continuous process for the nitration of toluene, the improvement which comprises continuously contacting, under conditions of agitation, substantially equimolar quantities of mixed nitration acid nitric acid component and toluene in a two-reactor system at a temperature within the range of 50 to 100° C., said mixed nitration acid containing, by weight, 50 to 60% sulfuric acid, 20 to 40% nitric acid and 10 to 20% water, reacting, by mixing in a continuous manner in the first reactor, a composition within the range of 0.4 to 0.7 mole of toluene per mole of said nitric acid component until an amount of nitric acid substantially in molar equivalence to said toluene is consumed, said effluent containing crude mononitrotoluene, sulfuric acid, water and nitric acid followed by contacting said effluent in a second reactor with toluene in an amount substantially in molar equivalence to the nitric acid in the effluent, until said nitric acid is consumed to produce a crude mononitrotoluene layer, which layer is convertible into a dinitrotoluene isomeric mixture having an increased ratio of 2,4-dinitrotoluene to 2,6-dinitrotoluene by further nitration.

2. In a continuous process for the nitration of toluene, the improvement which comprises continuously contacting, under conditions of agitation, substantially equimolar quantities of mixed nitration acid nitirc acid component and toluene in a two-reactor system at a temperature within the range of 50 to 100° C., said mixed nitration acid containing, by weight, 50 to 60% sulfuric acid, 20 to 40% nitric acid and 10 to 20% water, reacting, by mixing in a continuous manner in the first reactor, a composition within the range of 0.4 to 0.7 mole of toluene per mole of said nitric acid component until an amount of nitric acid substantially in molar equivalence to said toluene is consumed, said effluent containing crude mononitrotoluene, sulfuric acid, water, and nitric acid followed by contacting said effluent in a second reactor with toluene in an amount substantially in molar equivalence to the nitric acid in the effluent, until said nitric acid is consumed to product a crude mononitrotoluene layer, which layer is convertible into a dinitrotoluene isomeric mixture having an increased ratio of 2,4-dinitrotoluene to 2,6-dinitrotoluene by contacting, under conditions of agitation, said crude mononitrotoluene layer with a mixed nitration acid containing 5-10% molar excess of nitric acid.

3. In a continuous process for the nitration of toluene, the improvement which comprises continuously contacting, under conditions of agitation, substantially equimolar quantities of mixed nitration acid nitric acid component and toluene in a two-reactor system at 80° C., said mixed nitration acid containing, by weight, 50 to 60% sulfuric acid, 20 to 40% nitric acid and 10 to 20% water, reacting, by mixing in a continuous manner in the first reactor, a composition within the range of 0.4 to 0.7 mole of toluene per mole of said nitric acid component until an amount of nitric acid substantially in molar equivalence to said toluene is consumed, said effluent containing crude mononitrotoluene, sulfuric acid, water, and nitric acid followed by contacting said effluent in a second reactor with additional toluene, in an amount substantially in molar equivalence to the nitric acid in the effluent until said nitric acid is consumed to produce a crude mononitrotoluene layer which layer is convertible into a dinitrotoluene isomeric mixture having an increased ratio of 2,4-dinitrotoluene to 2,6-dinitrotoluene by further nitration.

4. In a continuous process for the nitration of toluene, the improvement which comprises continuously contacting, under conditions of agitation, substantially equimolar quantities of mixed nitration acid nitric acid component and toluene in a two-reactor system at 80° C., said mixed nitration acid containing, by weight, 50 to 60% sulfuric acid, 20 to 40% nitric acid and 10 to 20% water, reacting, by mixing in a continuous manner in the first reactor, a composition within the range of 0.4 to 0.7 mole of toluene per mole of said nitric acid component until an amount of nitric acid substantially in molar equivalence to said toluene is consumed, said effluent containing crude mononitrotoluene, sulfuric acid, water, and nitric acid followed by contacting said effluent in a second reactor with additional toluene, in an amount substantially in molar equivalence to nitric acid in the effluent until said nitric acid is consumed to produce a crude mononitrotoluene layer which layer is convertible into a dinitrotoluene isomeric mixture having an increased ratio of 2,4-dinitrotoluene to 2,6-dinitrotoluene by contacting under conditions of agitation, said crude mononitrotoluene layer with a mixed nitration acid containing 5–10% molar excess of nitric acid.

References Cited in the file of this patent

UNITED STATES PATENTS 2,012,985   Castner _____ Sept. 3, 1935

FOREIGN PATENTS 126,355   Great Britain _____ May 15, 1919

OTHER REFERENCES

British Intelligence Objectives Report No. 1144, pages 8–16. Received in U.S. Patent Office May 10, 1955.